United States Patent [19]

Liu

[11] Patent Number: 5,220,700
[45] Date of Patent: Jun. 22, 1993

[54] PROTECTIVE PILLOW

[76] Inventor: Ing-Nan Liu, No.38, Sec. 1, Muh-jan Rd., Taipei, Taiwan

[21] Appl. No.: 910,743

[22] Filed: Jul. 8, 1992

[51] Int. Cl.⁵ .............................................. A47G 9/00
[52] U.S. Cl. ......................................... 5/636; 5/640; 297/393; 2/205; 2/209.1
[58] Field of Search .......................... 5/636, 637, 640; 297/393, 397, 399, 400; 2/410, 205, 209.1; D6/601

[56] References Cited

U.S. PATENT DOCUMENTS

| 2,940,088 | 6/1960 | Boos | 5/636 |
| 3,017,221 | 1/1962 | Emery | 297/397 |
| 3,242,500 | 3/1966 | Derr | 2/205 |
| 4,180,868 | 1/1980 | Snow | 2/205 |
| 4,218,792 | 8/1980 | Kogan | 5/636 |
| 4,679,263 | 7/1987 | Honer | 5/636 |
| 4,738,488 | 4/1988 | Camelio | 5/636 |
| 5,127,120 | 7/1992 | Mason | 5/637 |

FOREIGN PATENT DOCUMENTS 993749  6/1951  France ................................ 297/399

Primary Examiner—Alexander Grosz
Attorney, Agent, or Firm—Larson and Taylor

[57] ABSTRACT

A protective pillow comprises two symmetrical side panels connected by a back panel which define a receiving space therein for the comfortable support of the head of a user. The back panel has an orthopedically engineered front surface which closely fits the back of the head. The side panels have bottom ends which terminate into hooks by which the pillow can be fastened or attached to the user's shoulders.

7 Claims, 6 Drawing Sheets

PROTECTIVE PILLOW

BACKGROUND OF THE INVENTION

The present invention relates to pillows and relates more particularly to a protective pillow having an orthopedically engineered back panel and two side panels for comfortably supporting the head of a user.

For the comfortable support or resting of the head of a user, motor vehicle manufacturers may attach a headrest to the driver's seat of a car. The known structures of headrests may be made in any of a variety of shapes to satisfy different consumers. However, none of these conventional headrests is orthopedically engineered to fit the curvature of the back of the head. Therefore a car driver will still feel uncomfortable after a long drive. Because the headrest is fastened to the driver's seat, it is less effective to protect the head. Under a sudden braking, or during a car accident, the driver's head may hit the headrest and cause heavy injury to the head.

SUMMARY OF THE INVENTION

The present invention has been developed under the aforesaid circumstances. It is therefore an object of the present invention to provide a protective pillow which is comfortable to use. It is another object of the present invention to provide a protective pillow which protects the head of a car driver. According to the preferred embodiment of the present invention, a protective pillow is generally comprised of two symmetrical side panels connected by a back panel with a receiving space defined therein for comfortably supporting the head of a user. The back panel has an orthopedically engineered front surface which closely fits the back of the head. The side panels have bottom ends which terminate into two corresponding hooks by which the pillow can be conveniently fastened to the user's shoulders.

DETAILED DESCRIPTION OF THE PREFERRED EMBODIMENT

Figure 1:
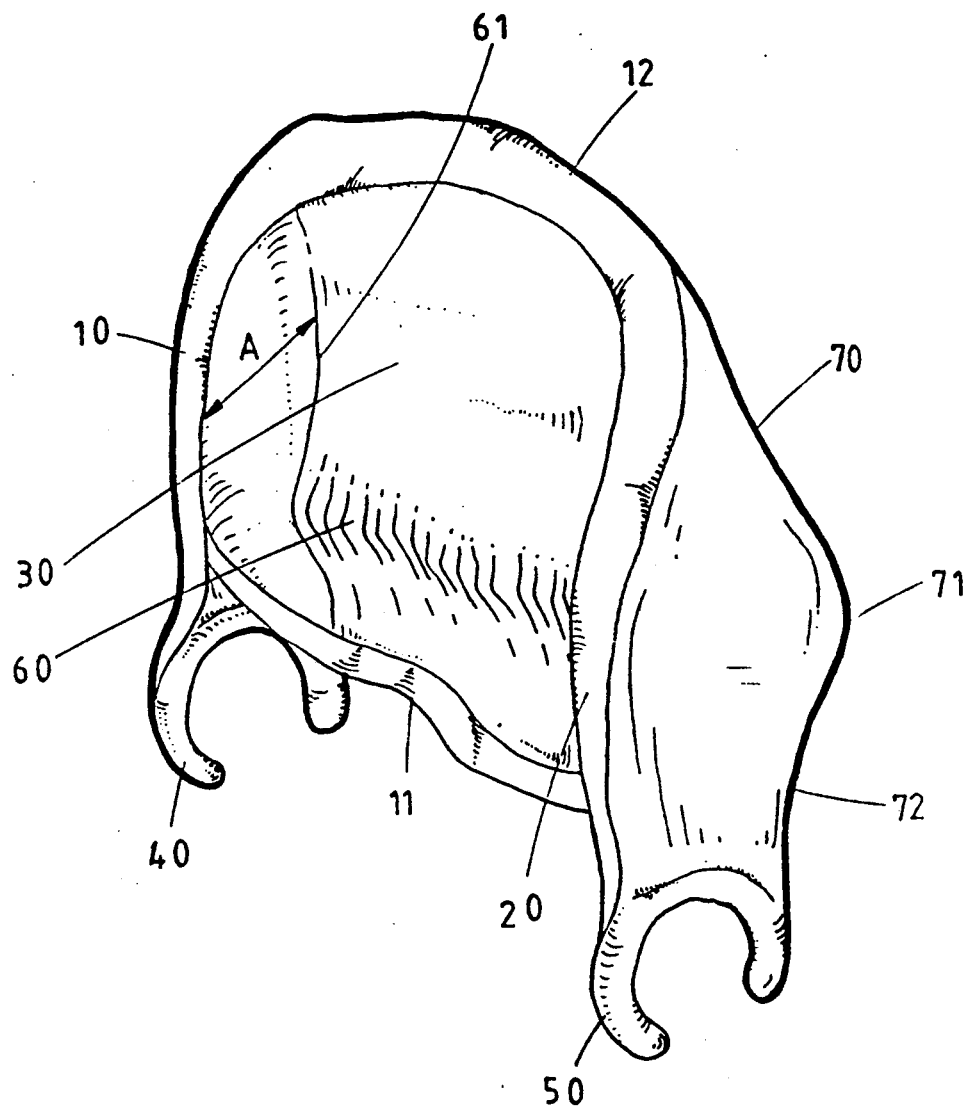
FIG. 1 is a front elevational perspective view of a protective pillow embodying the present invention.

Referring to FIG. 1, a protective pillow is comprised of two opposite side panels 10 and 20 connected by a back panel 30. Side panels 10 and 20 are symmetrical, each having a certain depth A measured from back panel 30 and a bottom end formed into a hook 40 and 50 respectively. Back panel 30 has a raised portion 60 on the front face spaced above bottom edge 11 thereof between two side panels 10 and 20, and an orthopedically engineered curved surface portion 61 between raised portion 60 and a top edge 12 thereof which fits the curvature of the back of the head. Back panel 30 has a back face curved outwardly and downwardly and formed into an upward slope 70, and then curved inwardly and downwardly and formed into a downward slope 72. Upward slope 70 meets downward slope 72 at a ridge 71.

Figure 2:
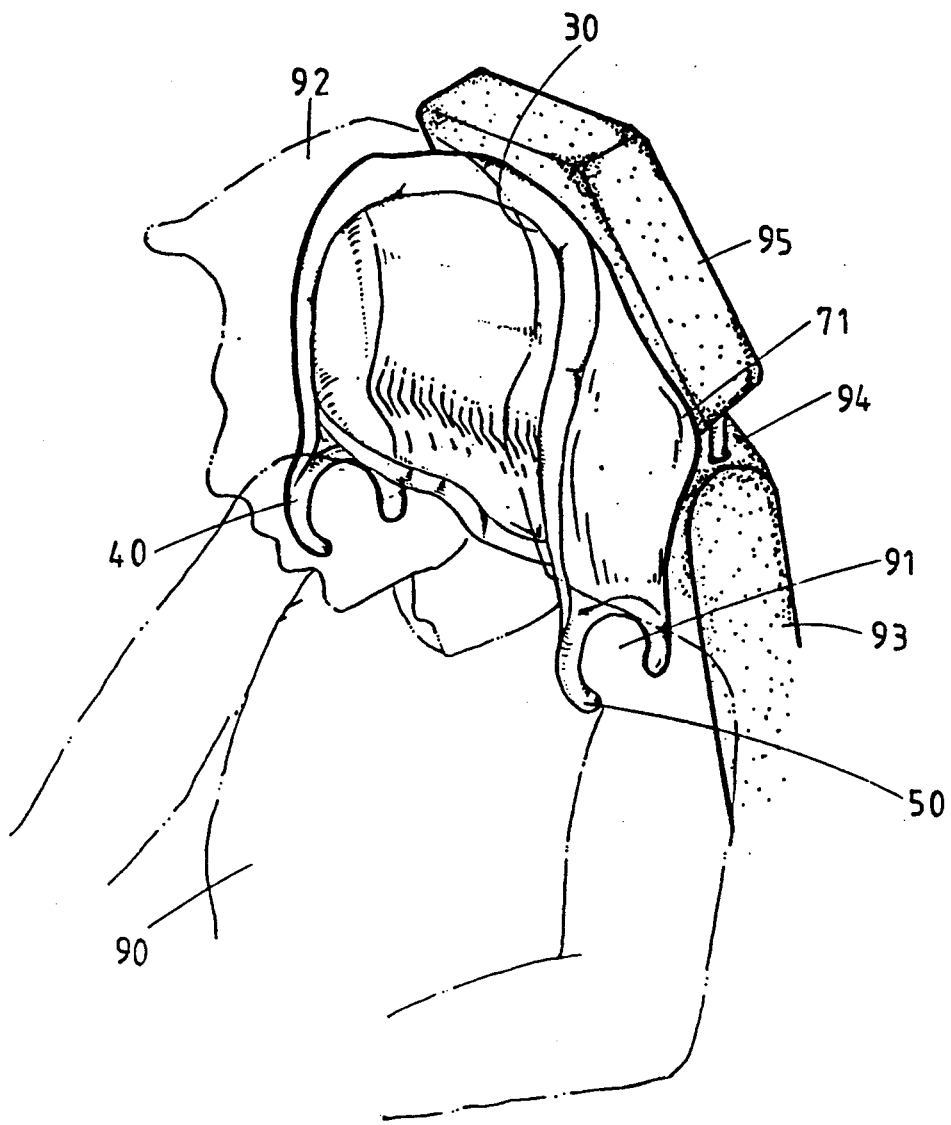
FIG. 2 is a front perspective view and illustrates that the protective pillow can be firmly supported on the headrest above a regular seat for the comfortable support of the head.

Referring to FIG. 2, by hooking hooks 40 and 50 on a user's shoulder 91, protective pillow 10 is secured to the user's body 90, permitting the user's head 92 to rest on back panel 30 within side panels 10 and 20. Ridge 71 of back panel 30 can be supported above the top edge 94 of a car seat 93 and below a headrest 95 of seat 93.

Figure 3:
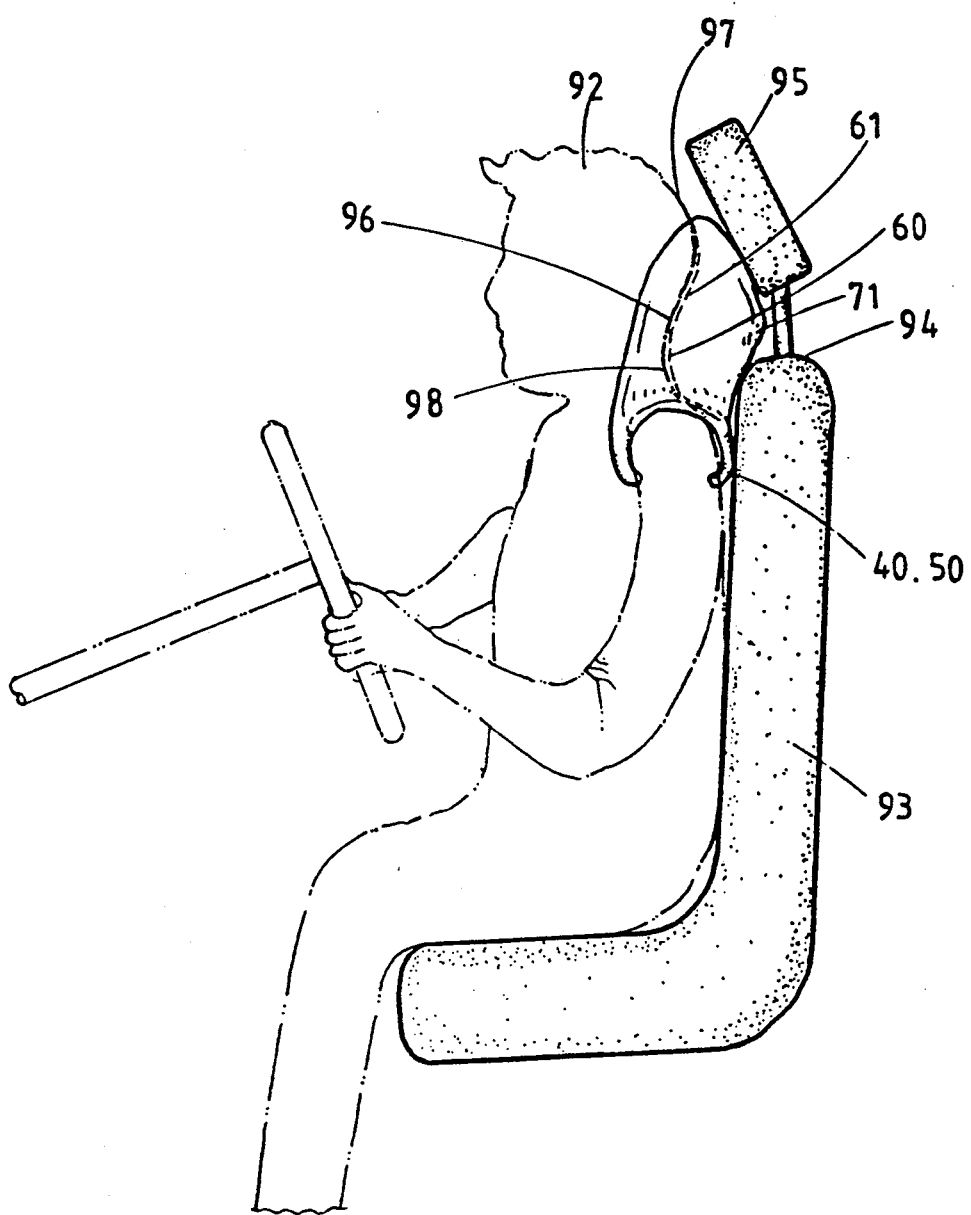
FIG. 3 is a side elevational view and illustrates that the protective pillow can be firmly supported on the headrest above a car seat for the comfortable support of the head.
Figure 4:
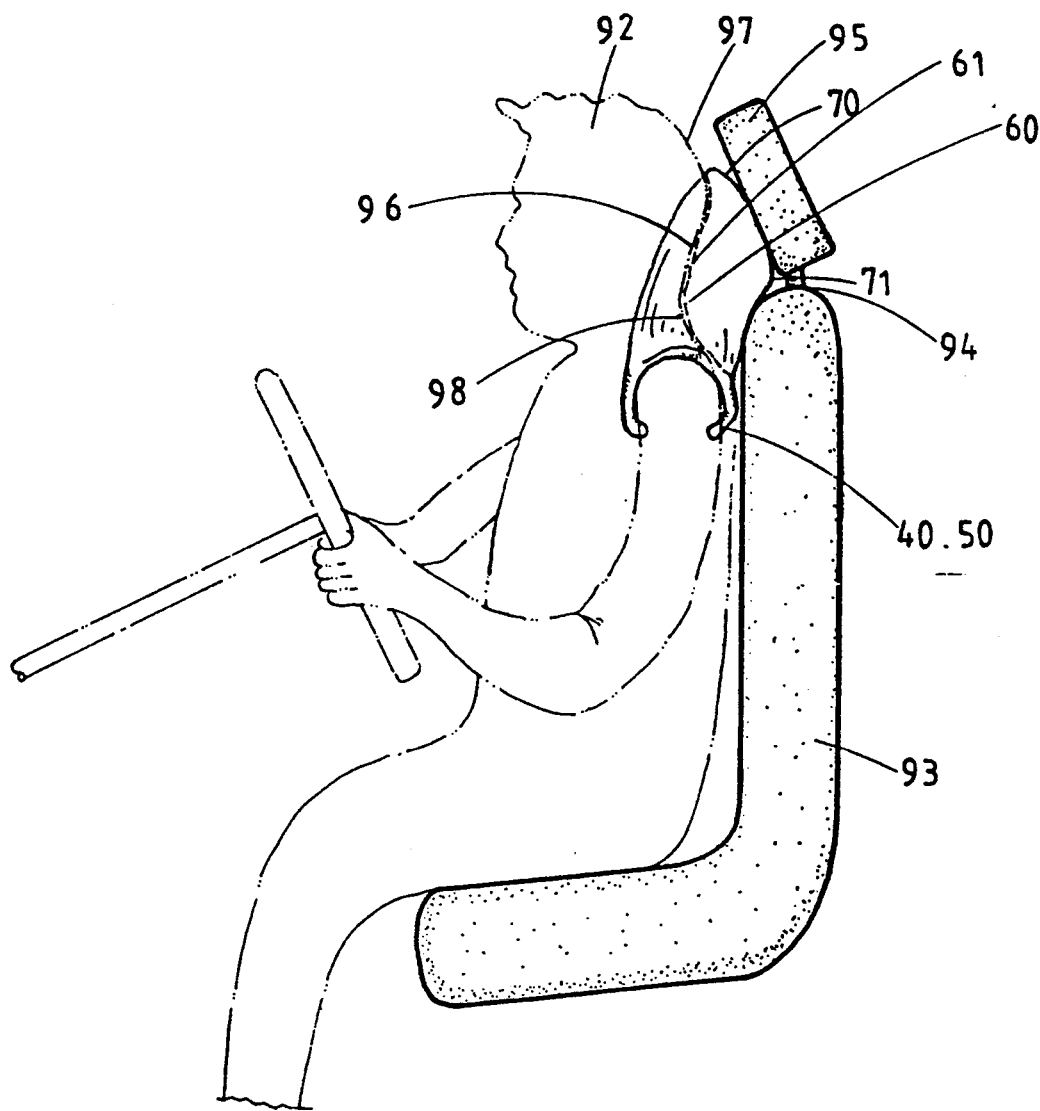
FIG. 4 is a side elevational view and illustrates that the pillow is still firmly retained in place to support the head while the user's body is moving.

Referring to FIGS. 3 and 4, protective pillow 10 is secured to a user's head 92 by hooks 40 and 50 with ridge 71 of back panel 30 supported above top edge 94 of the car 93 below headrest 95. Curved surface 96 of the back 97 of head 92 can closely fit into the orthopedically engineered curved surface portion 61 of back panel 30 with the user's neck 98 supported by the raised portion 60. Because protective pillow 10 is secured to a user's shoulder's, movement of head 92 does not cause protective pillow 10 to be removed from its secured location (see FIG. 4).

Figure 5:
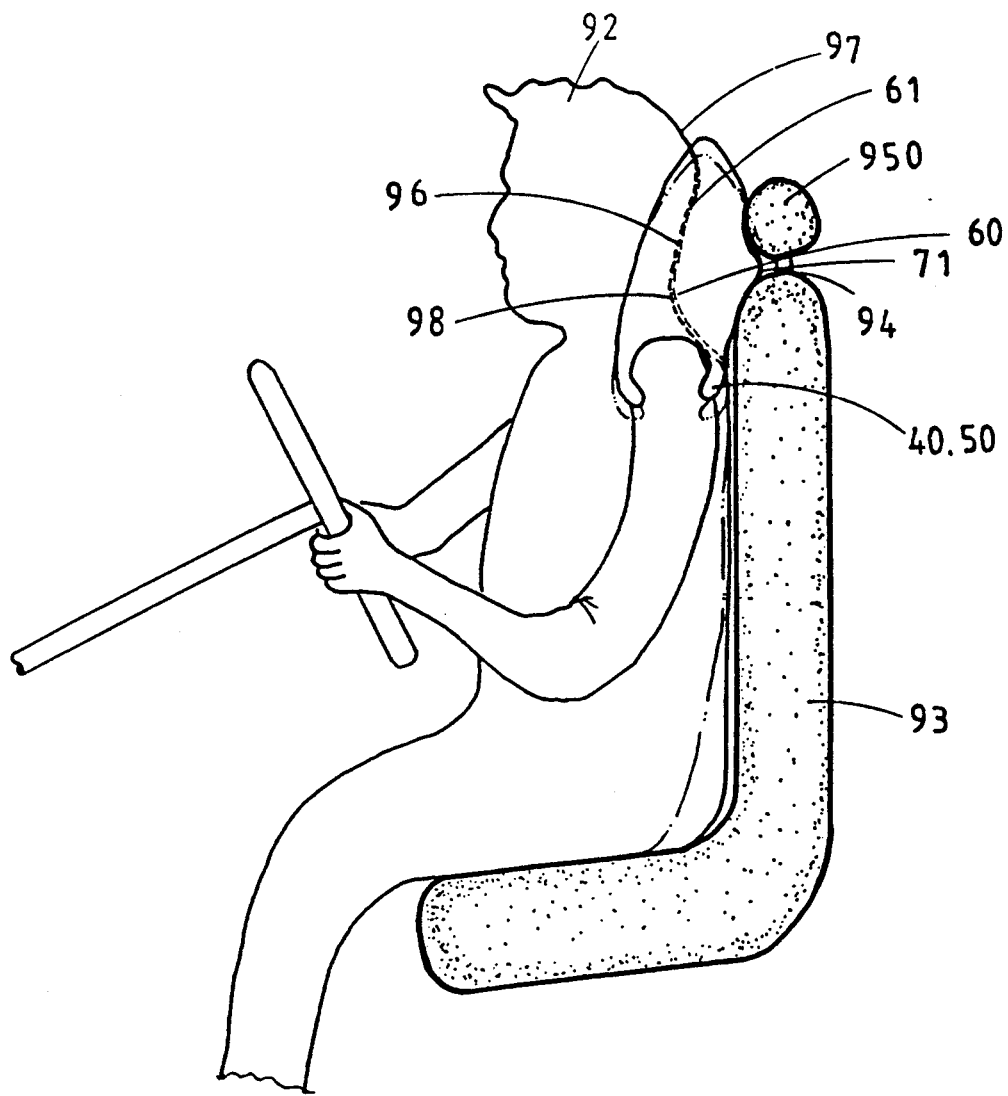
FIG. 5 is a side elevational view and illustrates that the protective pillow can be firmly supported on a cylindrical headrest.

Referring to FIG. 5 there is illustrated the use of protective pillow 10 on and supported by a cylindrical headrest 950 mounted above a car seat 93 to support and protect the user's head 92.

Figure 6:
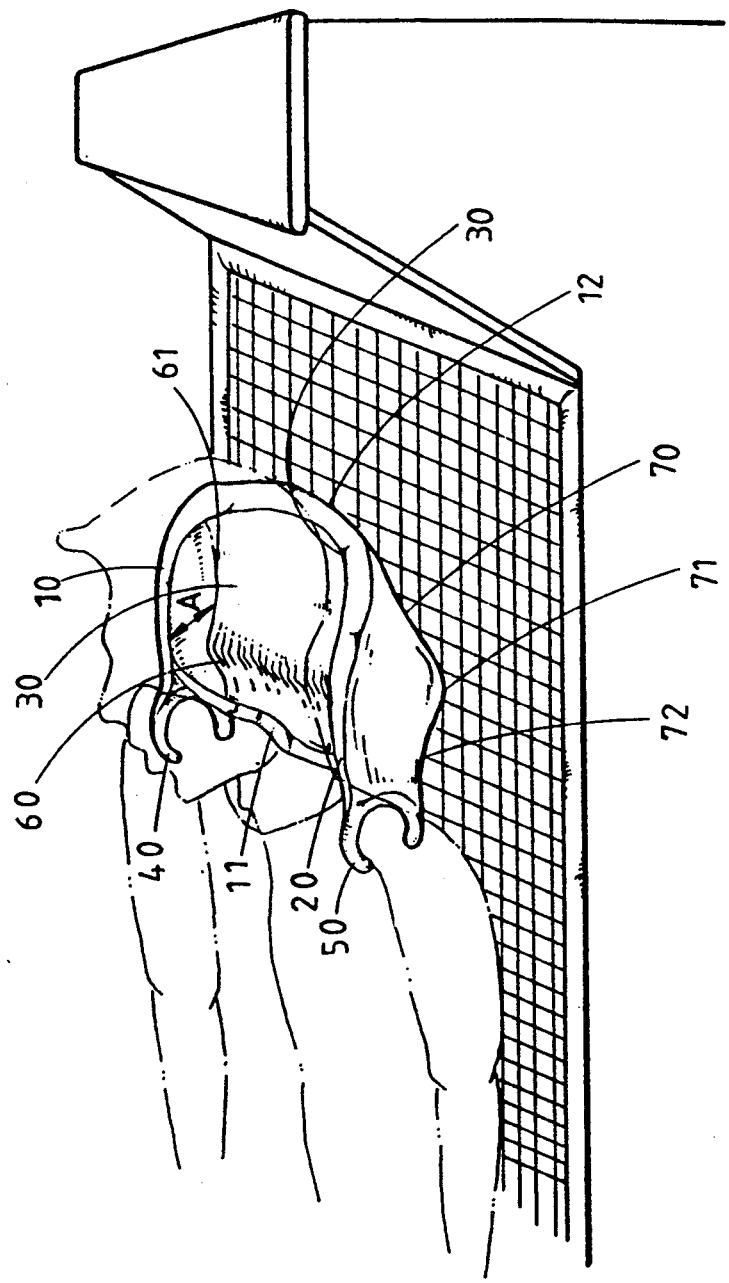
FIG. 6 is a top perspective view and illustrates that the protective pillow can be used under the head when the user is lying in bed.

Referring to FIG. 6, protective pillow 10 is illustrated when used under the head when a user is lying in bed. Because the back of the head is closely supported on the back panel of the protective pillow, the user will feel comfortable.

Referring to the annexed drawings again, and to FIG. 1 in particular, the depth A of the side panel 10 or 20 should be limited to a certain range so as not to obstruct the functions of the ears and the eyes. Side panels 10 and 20 and back panel 30 may be made from a suitable shock absorbing material or stuffed with it so that protective pillow 10 can effectively absorb or lessen shocks transmitted to the head.

What is claimed is:

1. A protective pillow comprising
two symmetrical elongate side panels, each side panel having a front edge and a rear edge; and
an elongate back panel having a top edge, a bottom edge, and two side edges, each said side panel rear edge integral with a corresponding back panel side edge, and said sides extending forwardly of said back panel, said side panels and said back panel defining a receiving space into which a user's head can fit closely, said back panel also having a front face and a rear face and having a raised portion on said front face spaced above said bottom edge thereof between said side panels, a curved surface portion between said raised portion and said back panel top edge, said back panel rear face having an upper sloping portion curved rearwardly downwards and terminated into a ridge, and a lower sloping portion curved forwardly downwards and extended from said ridge to said back panel bottom edge.

2. The protective pillow according to claim 1, wherein said curved surface portion between said raised portion and said top edge of said back panel has a curvature matching that of the back of the head of a user.

3. The protective pillow according to claim 1, wherein said side panels each has a width extending in the forward direction that is smaller than the distance from the back of the head of a user to the ear of the user such that the ears of the user are not covered when the pillow is put on the head.

4. The protective pillow according to claim 1, wherein said side panels each have a bottom end terminated into a hook for fastening to the shoulder of a user.

5. A protective pillow comprising
two symmetrical elongate side panels, each side panel having
a front edge and a rear edge,
a width extending in the forward direction that is smaller than the distance from the back of the head of a user to the ear of the user such that the ears of the user are not covered when the pillow is put on the head, and
a bottom end terminated into a hook for fastening to the shoulder of a user; and
an elongate back panel having a top edge, a bottom edge, and two side edges, each said side panel rear edge integral with a corresponding back panel side edge, and said sides extending forwardly of said back panel, said side panels and said back panel defining a receiving space into which a user's head can fit closely, said back panel also having a front face and a rear face and having a raised portion on said front face spaced above said bottom edge thereof between said side panels, a curved surface portion between said raised portion and said back panel top edge, said back panel rear face having an upper sloping portion curved rearwardly downwards and terminated into a ridge, and a lower sloping portion curved forwardly downwards and extended from said ridge to said back panel bottom edge.

6. A protective pillow comprising
two symmetrical elongate side panels, each side panel having
a front edge and a rear edge, and
a bottom end terminated into a hook for fastening to the shoulder of a user; and
an elongate back panel having a top edge, a bottom edge, and two side edges, each said side panel rear edge integral with a corresponding back panel side edge, and said sides extending forwardly of said back panel, said side panels and said back panel defining a receiving space into which a user's head can fit closely.

7. A protective pillow according to claim 6 wherein each side panel further has a width extending in the forward direction that is smaller than the distance from the back of the head of a user to the ear of the user such that the ears of the user are not covered when the pillow is put on the head.

* * * * *